Sept. 5, 1961  E. L. ADAMS ET AL  2,998,621
GUIDING MEANS FOR PLASTIC TUBING
Original Filed Jan. 8, 1959  3 Sheets-Sheet 1

INVENTORS
ELMER L. ADAMS
BY RICHARD C. GASHIRE
W. A. SCHACH &
LEONARD D. SOUBIER
ATTORNEYS

INVENTORS
ELMER L. ADAMS &
BY RICHARD C. GASMIRE
W. A. SCHAICH &
LEONARD D. SOUBIER
ATTORNEYS

United States Patent Office 2,998,621
Patented Sept. 5, 1961

2,998,621
GUIDING MEANS FOR PLASTIC TUBING
Elmer L. Adams and Richard C. Gasmire, Toledo, Ohio, assignors to Owens-Illinois Glass Company, a corporation of Ohio
Original application Jan. 8, 1959, Ser. No. 785,736. Divided and this application Jan. 30, 1959, Ser. No. 790,099
8 Claims. (Cl. 18—5)

This invention relates to an improved apparatus for manufacture of hollow plastic articles, such as bottles, toys, dolls, and the like, from extruded lengths of hollow tubular form thermoplastic material by expanding such tubular formations while in heated and expandable condition within the confines of a shaping mold. This invention constitutes a division of our co-pending application Serial No. 785,736, filed January 8, 1959, and assigned to the assignee of this invention, now abandoned.

In known processes for forming hollow plastic articles by blowing of a heated thermoplastic tube in a partible mold, such as illustrated in United States Patent No. 2,810,934 to Bailey, the heated thermoplastic tubing is extruded in a freely pendant vertical form from a horizontally-disposed orifice. It is a matter of some difficulty to extrude such a freely pendant tube of hot and workable plastic in a straight line. It is quite common for the end of the extruded tube to curl laterally out of alignment with the axis of the extruder orifice. Accordingly, prior art machines have commonly employed a mandrel over which the tube is extruded to assure the positioning or aligning of the extruded tube so that upon the subsequent closing of a partible mold about the tubing the tubing will be concentrically aligned with respect to the mold cavity.

It is an object of this invention to provide an improved appartus for guiding and aligning a vertically-extruded tube of thermoplastic material with respect to a partible mold so that the tube will always be properly positioned with respect to the partible mold prior to the closing of such mold.

A particular object of this invention is to provide a tube-positioning apparatus for a vertically-extruded tube of thermoplastic material which contacts only the lowermost portions of the tube to effect a desired alignment of the tube with respect to a partible mold.

Still another object of this invention is to provide a tube-positioning apparatus for a plastic blowing machine which effects a desired alignment of the heated plastic tube with respect to a partible mold without subjecting any portion of the plastic tube which is to be blown in the partible mold to any extraneous chilling influences.

The specific nature of this invention, as well as other objects and advantages thereof, will become apparent to those skilled in the art from the following detailed description and the accompanying drawings, on which, by way of preferred example only, is illustrated one embodiment of this invention.

Figure 1:
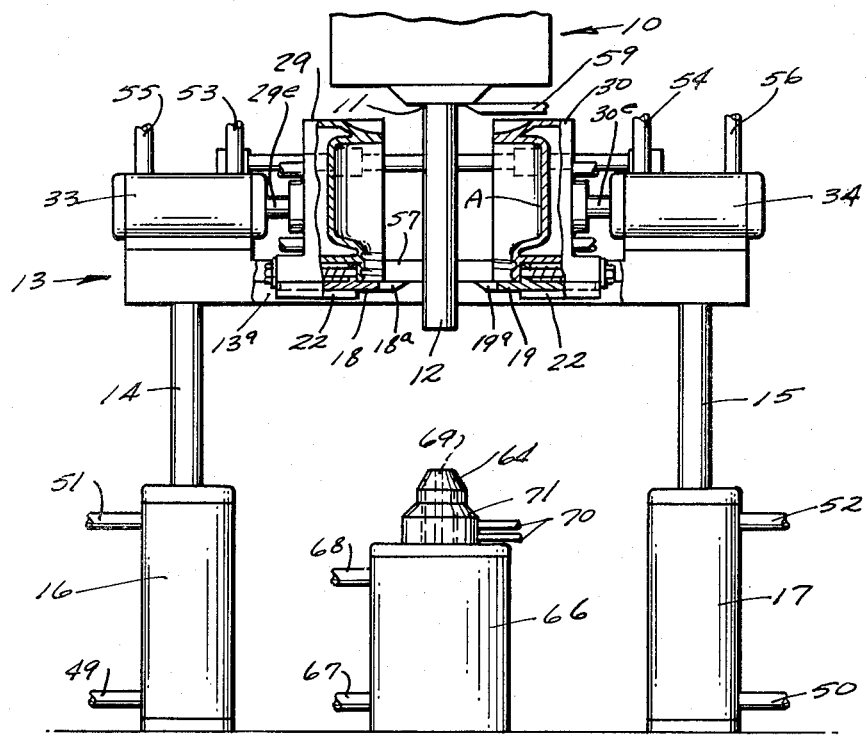
FIG. 1 is a side elevational view, shown partly in section, of one form of plastic blowing machine to which this invention may be advantageously applied.

While not limited thereto, the tube positioning mechanism embodying this invention is most advantageously utilized in connection with the forming of hollow plastic articles from a freely extruded, vertically pendant tube of plastic material. Any conventional plastic extruder may be utilized having a downwardly directed annular orifice capable of issuing a freely pendant hollow tubular formation of plastic material from that orifice at a temperature permitting subsequent working of the issued tubular formation as by expansion and setting in a mold. Preferably, the issuing end of the tubular formation is open.

After a sufficient length of tubing has been issued from the annular orifice, the bottom end portion of the extruded tubing is engaged by the positioning mechanism embodying this invention and a lateral restraint is thereby imposed on the tubing in order to correctly position, guide and align the issued tubing for the subsequent closing of the partible mold therearound. Preferably, the positioning device constitutes a pair of split holding members which are movable toward and away from each other in the same horizontal plane. The vertical opposed faces of such holding members are respectively provided with tube engaging notches which engage opposite sides of the bottom end of the extruded tube and urge such bottom end of the tube to a desired position as a consequence of further movement of the holding members to an abutting relationship wherein the aligned notches then define a closed aperture having approximately the same diameter as the extruded tube.

Such holding members are preferably operated in a horizontal plane which is adjacent to the bottom face of the segments of the partible mold. A particular advantage of this invention results from the mounting of the holding members respectively on the partible mold segments, thereby permitting utilization of the opening and closing movements of the partible mold segments to operate the holding members and eliminating the need of any separate hydraulic cylinders or other motor means for actuating the holding members.

To eliminate any interference of the holding members with the closing movements of the mold segments, the holding members are respectively slidably mounted on the mold segments and resiliently biased to a forwardly projecting relationship with the corresponding mold segment so that upon closing movements of the mold segments, the holding members are first brought into abutment and then the mold segments are closed without disturbing the abutting relationship of the holding members, such closing movements merely effecting a compression of the springs which are respectively mounted between the holding members and the mold segments.

After the mold segments are closed on the length of tubing, the tubing may be blown to conform to the mold cavity by any conventional procedure such as by inserting a blow head into the lower end of the tubing or by bringing a blow head into engagement with such lower end. After the expansion of the tubing to conform to the mold cavity and sufficient cooling of the thermoplastic material to permit it to achieve a self-supporting consistency, the mold segments are horizontally opened and they carry with them the holding members to a remote position relative to the extruder axis and the blown plastic article may thus be removed from the mold and the holding members.

It will be noted from the foregoing description that the entire plastic article is formed by blowing, and more importantly, all portions of the heated thermoplastic tubing which make up the formed article are expanded by blowing without having been subjected to any extraneous chilling influences or contacts prior to contacting the walls of the closed partible mold. The only portion of the tubing which has been subjected to a chilling contact is that axial end portion which is engaged by the holding members prior to closing of the mold segments; however, this axial end portion is external to the mold and does not form any part of the finished plastic article but is severed therefrom by a cutting operation subsequent to the expansion of the tubing in the mold.

Figure 2:
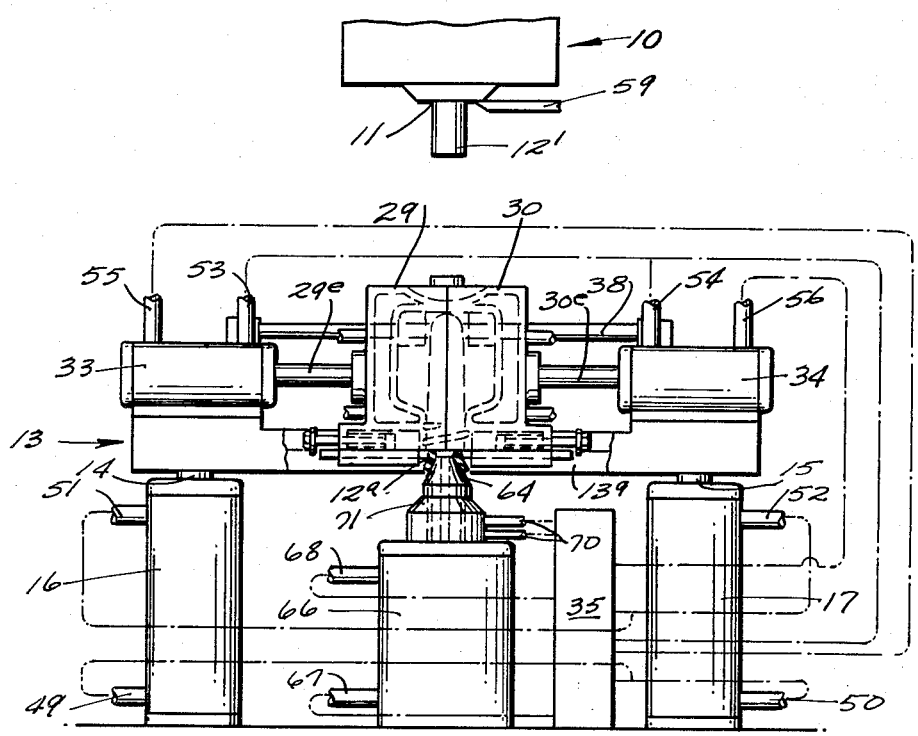
FIG. 2 is a view similar to FIG. 1, but illustrating the mold components of the plastic blowing machine in their closed blowing position.

Referring now to the drawings, one form of plastic blowing machine utilizing the improved tube guiding device of this invention will be described. Referring to FIGS. 1 and 2, an extruder 10 has a downwardly directed orifice 11 capable of issuing therethrough a hollow tubular formation of any suitable organic plastic material in heated condition and capable of expansion and then setting to shape upon cooling. There is a wide range of such materials presently offered on the commercial market, for example, commercial grades of polyethylene and polystyrene. The extruder may be of any well known type capable of continuous operation in which an applied pressure performs the operation of plasticizing the organic plastic material by the application of heat and pressure. The thus heated plasticized material is continuously extruded in a hollow tubular form 12.

The molding apparatus comprises a horizontal mold bed 13 which is mounted on vertical piston rods 14 and 15 of fluid pressure actuated vertically reciprocable motors 16 and 17, respectively, operable for vertical movement toward and away from the extruder orifice 11. Mold bed 13 has a central elongated slot 13a.

Figure 5:
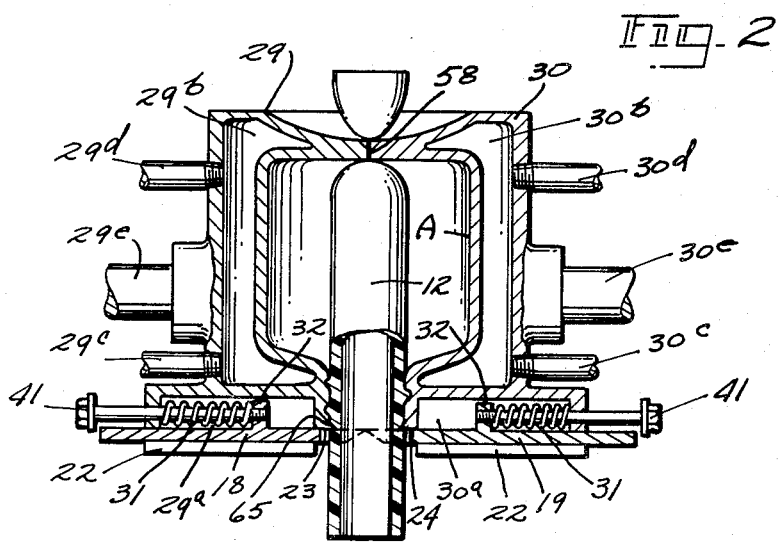
FIG. 5 is a view similar to FIG. 3, but illustrating the mold segments in their closed position.
Figure 4:
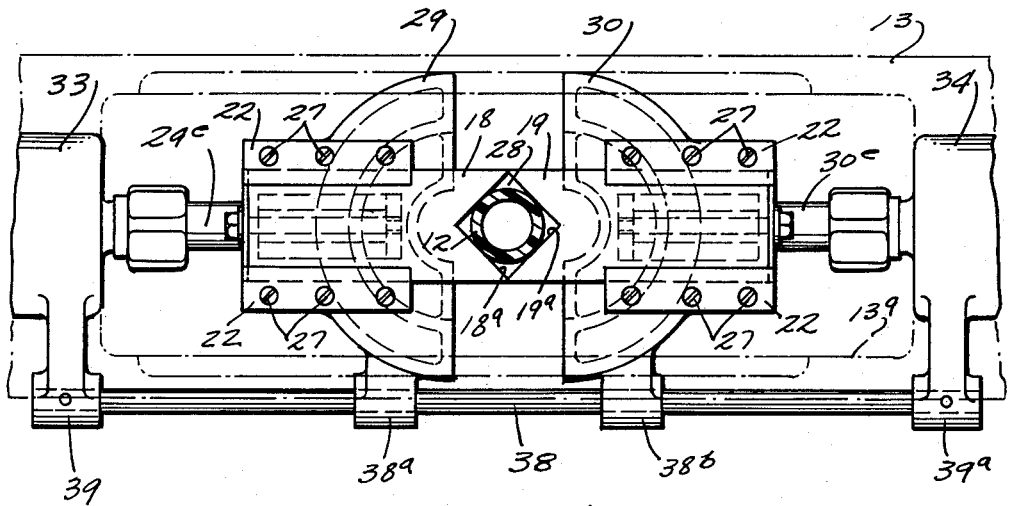
FIG. 4 is a sectional view taken on the plane 4—4 of FIG. 3.
Figure 6:
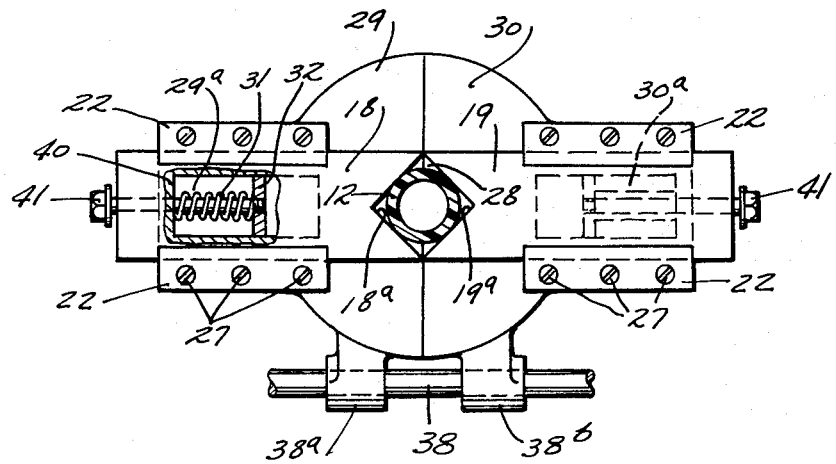
FIG. 6 is a bottom elevational view of FIG. 5.

A pair of partible mold sections 29 and 30 are mounted on piston rods 29e and 30e, respectively, of the horizontally reciprocating fluid pressure actuated motors 33 and 34. The motors 33 and 34 are rigidly connected near the side margins of the mold bed 13 and are operable to actuate the partible mold sections 29 and 30 toward and away from each other concentrically relative to the extruded tube 12 between open and closed positions of the mold. These mold sections 29 and 30, when closed, define a molding cavity A (FIGS. 2 and 5) corresponding to the configuration of the desired plastic article. The lower faces or surfaces 23 and 24 of the two mold sections 29 and 30 are in abutting relationship with the top side of movable tube aligning members 18 and 19. The movable tube holding members 18 and 19 are slidably mounted in slideway recesses 29a and 30a respectively provided in the bottom external faces 23 and 24 of each mold half 29 and 30. Recesses 29a and 30a are partially closed to define slideways for the holding members 18 and 19 by plates 22 which are secured to the mold section by screws 27. Springs 31 are interposed between upstanding flanges 32 formed on the upper surfaces of each holding member 18 and 19 and the wall portions 40 of each mold half 29 and 30. Restraining pins 41 are respectively threaded into flanges 32 and adjustably limit the outward motion of the members 18 and 19. These springs and the cooperating stops hold the aligning members 18 and 19 in forwardly projecting relationship with respect to the split faces of the mold halves and thereby meet and encompass the extruded tube 12 prior to the meeting or closing of the mold halves on the vertical axis of the extrusion.

The opposed vertical surfaces of the holding members 18 and 19 are respectively provided with tube engaging tapered notches 18a and 19a having an open end substantially larger than the plastic tube 12. When holding members 18 and 19 are moved into abutting relationship, the notches 18a and 19a cooperate to define an aperture 28 axially aligned with the extruder axis and having an effective width approximately equal to the diameter of the extruded tube 12. As shown on FIG. 1, the two mold halves 29 and 30 are retracted so that the tube holding members 18 and 19 are in their open positions and the aperture 28 is opened to its greatest extent. This position of the aligning members thereby permits the free entry of the tube 12 therebetween as it is directed from the extruder orifice 11 into the aperture 28 when the mold bed 13 is positioned in its uppermost position, shown in FIG. 1, hereafter called the "loading position," by the extension of the vertical piston rods 14 and 15. In the arrangement shown on the drawings, the cavity A of the closed mold sections 29 and 30 defines a bottle configuration which is in inverted relationship so that the end or outermost face of the neck of the bottle will be disposed in the same plane as the bottom surfaces 23 and 24 of these mold sections.

Figure 3:
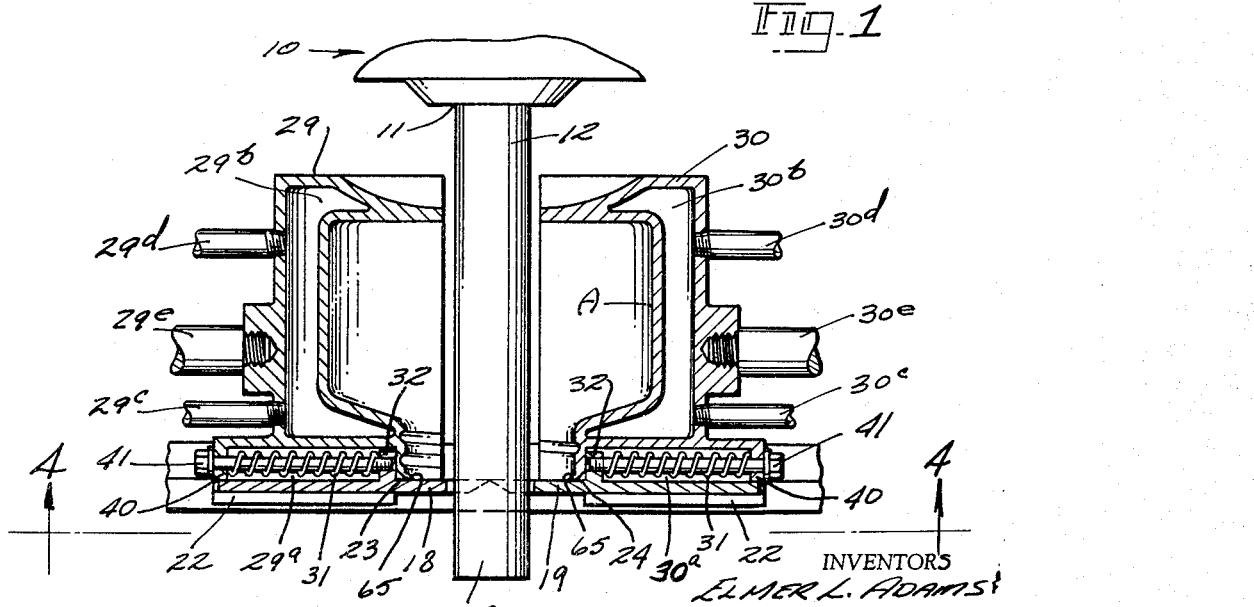
FIG. 3 is an enlarged scale vertical sectional view of the mold segments of the machine of FIG. 1, incorporating a tube positioning device in accordance with this invention.

As seen in FIG. 3, the mold sections 29 and 30 each have internal coolant chambers 29b and 30b which are adapted to receive a coolant fluid, such as cool water, at inlet connections 29c and 30c and circulate the coolant along the walls of cavity A to remove heat from the blown plastic after tube 12 is blown against those walls. The coolant is exhausted at outlet connections 29d and 30d. This technique of cooling the molds is a required expedient for accelerating the setting of the blown plastic article in the mold to thereby increase the speed at which the forming cycle may be successively repeated. The aligning members 18 and 19 may be provided with cooling means if desired or required and will assist in chilling the plastic in the axial lower end portion of the tube 12 and prevent the plastic from sticking on the tapered blow head 64.

When it is desired to initiate the cycle for forming a container, as illustrated on the drawings, a timing device 35 (FIG. 2) will provide fluid under pressure to the lower ports 49 and 50 of the motors 16 and 17 so as to move the mold bed 13 upwards toward the orifice 11 to the "loading position," as shown in FIG. 1. During this actuation, fluid is exhausted through ports 51 and 52, respectively, of the said motors 16 and 17. Prior to this upward movement of the mold bed 13, the mold sections 29 and 30, and hence the tube holding members 18 and 19 are in their horizontally spaced or "open" positions. The timing device 35 may be such as that manufactured by the Eagle Signal Company of Moline, Illinois, which is a device driven by an electric motor to actuate a series of electrical contacts in any predetermined order to thereby actuate pressure valves in said order. Also, before this upward movement of the mold bed 13 takes place, the fluid motors 33 and 34 have been actuated by the timer 35 to receive actuating fluid so that they move the mold sections 29 and 30 to their "open" position.

These mold sections 29 and 30 may, if desired, be directly mounted on mold bed 13 for horizontal sliding movement with respect thereto. For example, each mold section 29 and 30 may slide in a depression or groove 57 defining horizontally the travel of these sections in the top surface of mold bed 13 to guide the lateral movements of the mold sections with respect to the mold bed. Horizontal guide rod 38 maintains the mold sections parallel during their horizontal movement through its sliding connection with the mold sections by lugs 38a and 38b. Said rod is mounted in stationary lugs 39 and 39a formed on the motors 33 and 34, respectively.

With the mold bed 13 in the loading position (FIG. 1), the molding members 18 and 19 and the mold sections 29 and 30 are each "open." A lower axial end portion 12a of the extruded tubing 12 will enter between the open holding members and the mold sections. The motors 33 and 34 are then actuated by timer 35 by connecting pressurized fluid to their ports 55 and 56 and exhausting fluid from their ports 53 and 54 to initiate movement of the mold halves 29 and 30 with the members 18 and 19 toward each other so that the aperture 28 closes about the tubing portion 12a. If, during the extrusion of tubing 12, the alignment of this freely pendant tubing 12 deviates from the axis of orifice 11, the closing of the aperture 28 of the holding members 18 and 19 will align the tubing 12 so that is coaxial with the axis of the orifice 11 and hence concentric with respect to the open mold sections.

In the bottle configuration illustrated by mold cavity A, the mold sections 29 and 30 define the mold cavity A in inverted relationship so that the end face of the neck of the desired bottle will be disposed in the same plane as the bottom surfaces 23 and 24 of the mold sections 29 and 30. Thus, the mold sections 29 and 30 are closed about the length of tubing 12 that is above the top surface of the closed holding members 18 and 19. In closing the mold sections, the bottom mold faces 23 and 24 are disposed in a tight contiguous engagement with this top surface of the holding members.

Relating to closing the mold sections 29 and 30 as shown on FIG. 2, the motors 33 and 34 are connected to pressurized fluid through ports 55 and 56 and fluid is exhausted from motors 33 and 34 through ports 53 and 54.

In closing of the mold sections 29 and 30, as illustrated in FIG. 2, the top edges of such mold sections achieve a pinching and sealing action at the top end of the length of the tubing 12 enclosed in such mold, such as indicated at 58.

Concurrently with the closing of the mold sections 29 and 30 or immediately thereafter, the tubing 12 is severed from the plastic issuing from the extruder (FIG. 2). As illustrated in the drawings, such severing may be accomplished by a laterally shiftable knife-element 59 which is immediately below the extruder orifice 11. Knife 59 may be actuated by a suitable fluid operated reciprocating cylinder motor (not shown) under control of timer 35 to effect the desired severing movement. Preferably, the severing accomplished by the knife 59 is done in a rapid fashion so as to leave the oncoming end of the next length of tubing 12' open.

Concurrently with the severing action of knife 59, or immediately thereafter, the mold bed 13 and closed partible mold sections 29 and 30 are moved downwardly relative to the orifice 11 and at a speed greater than the extrusion rate of the oncoming tubing 12' so as to space apart the severed ends of the tubing and permit the extruder 10 to operate continuously (FIG. 3). By so doing, the extruder will issue a successive length of tubing 12 while the molding apparatus is performing the hereinafter described blowing operations for forming the bottle. The movement of bed 13 between loading and blowing positions is accomplished under control of timer 35.

Mold bed 13 is moved down to the "blowing position" by motors 16 and 17 which receive pressurized fluid through their ports 51 and 52 and exhaust fluid through their ports 49 and 50. The mentioned blowing position of mold bed 13 is shown in FIG. 2.

A blow head 64 is provided in axially aligned relationship with aperture 28. The blow head 64 has tapered side walls and is correspondingly similar in configuration to the closed aperture 28 when the holding members 18 and 19 are closed. As seen on FIG. 2, the blow head 64 is of a slightly lesser diameter than the side walls of the aperture 28 so that when the blow head is inserted within the aperture, it will receive the axial end portion 12a of the tubing and press it out against the tapered side walls of the aperture 28. At the top of the aperture side wall the lower edge of the mold halves are provided with a thin annular lip 65 which is knife sharp. The blow head 64 is reciprocated vertically in and out of position shown in FIG. 2 by having a connection with the fluid actuated motor 66 which is also controlled by the timer 35. It is preferred that the motor 66 be connected to receive pressurized fluid through its port 67 to extend the blow head 64 to its uppermost position prior to or at the time of inserting it into the internal bore of the end portion of the tubing 12a. The blowing tool or head is thus inserted by lowering the mold bed 13 to its lowermost or blowing position. When the end portion 12a of the tube is brought down over the blow head 64, an annular score is pressed in the tubing along the plane of the top surface of the holding members 18 and 19 (see FIG. 5), and, simultaneously with this pressing action, the blow head achieves a seal with the internal bore of the severed length of the plastic tubing 12. Thereafter a blowing fluid is supplied under pressure through an axial passage 69 in blow head 64 which expands the length of tubing in the closed mold to the configuration of the mold cavity A. This blowing fluid is connected at line 70 which communicates with the axial passage 69 within the blow head housing 71 and which is connected through timer 35. When the blowing head 64 is extended, a valve (not shown) of timer 35 is used to turn the blowing fluid "on" and "off" to achieve the desired duration and timing for applying blowing fluid to the head 64 when the latter is extended. During this blowing operation, the same fluid pressure will further force the tubing at the axial end of the neck outwardly against the annular lip 65, hence, the score line is further accentuated. The fluid pressure for blowing is maintained by the blow head 64 for a sufficient length of time to insure the expansion and setting of the plastic of the tubing to conform to the molding cavity A. After the end of the blowing period, the mold sections 29 and 30 are shifted each to their open position and the formed plastic article may be removed therefrom. As the mold sections 29 and 30 move outwardly they carry with them the respective positioning or holding devices 18 and 19. The excess plastic formed on the bottle may be trimmed therefrom by a cutting operation performed either prior to opening of the mold sections 29 and 30 or as an entirely subsequent operation on the plastic article.

Since the extruder 10 has been operating continuously, a new length of plastic tubing is immediately ready to begin a next cycle to produce in succession the next plastic article.

From the foregoing description, it will be apparent that this invention provides simple yet effective mechanism for positioning a freely pendant heated tube of thermoplastic material relative to the segments of a blow mold. The spring-pressed shiftable mounting of the positioning devices respectively on the mold segments permits the tube guiding and positioning action to be obtained without necessitating the addition of separate hydraulic cylinders to effect the necessary movements of the tube positioning devices.

It will, of course, be understood that various details of construction may be modified through a wide range without departing from the principles of this invention, and it is, therefore, not the purpose to limit the patent granted hereon otherwise than necessitated by the scope of the appended claims.

We claim:

1. Apparatus for positioning a freely vertically pendant moldable plastic tube relative to a partible blow mold, said mold having a pair of cooperating mold segments horizontally shiftable relative to each other between open and closed positions, comprising a pair of plates, each plate having a tube engaging notch in one edge thereof, means for shiftably mounting said plates respectively on said mold segments in horizontally opposed relationship, said plates being respectively carried by said mold segments, means for yieldably positioning said plates respectively in forwardly projecting relationship to said mold segments, whereby closing movements of said mold segments relative to said moldable plastic tube engage said plates with said tube in advance of said mold segments, said notches being shaped to shift said molded tube to a desired position relative to said mold segments.

2. In apparatus for forming plastic articles by expansion of a heated thermoplastic tube in a partible two-section mold, the improvement comprising a tube aligning device shiftably mounted on one of the mold sections and carried therewith, means for resiliently positioning said device in forwardly projecting relationship relative to said mold segment, said device having a tube engaging tapered notch in its leading surface, said notch being concentrically disposed relative to the mold cavity and having an opening substantially wider than the thermoplastic tube, whereby the walls of said notch can guide the tube to an aligned position relative to said mold cavity incident to the closing movement of said mold segment, and means for stopping movement of said aligning device at the desired position of alignment of said tube.

3. The improvement of claim 2, wherein a horizontal outer end face of said mold segment defines a slideway recess extending in the direction of open and closing movements of said mold, and said aligning device having a portion thereof slidably mounted in said recess.

4. In an apparatus for forming a blown plastic article from a blowable plastic tube and including a pair of cooperating mold segments movable into abutment to enclose a portion of the tube and means to inject a blowing medium thereinto to inflate the mold enclosed portion of the tube against the mold cavity defined by the mold segments, the improvements of means to position the tube prior to closure of the mold segments thereon and including a positioning element carried by each of said mold segments, said elements projecting generally radially of the tube inwardly from the mold segments and having confronting faces provided with central notches and abutment surfaces to either side of said notches, initial tube-enclosing movement of said mold segments bringing said abutment surfaces of said elements into abutment with the tube confined by the registering central notches in alignment with the mold segments, and lost-motion means accommodating full closure of the mold segments while maintaining said element abutment surfaces in engagement and the tube confined by the notches.

5. In an apparatus for forming a blown plastic article from a blowable plastic tube and including a pair of cooperating mold segments movable into abutment to enclose a medial portion of the tube and means to inject a blowing medium thereinto to inflate the mold enclosed portion of the tube against the mold cavity defined by the mold segments, the improvements of means to position the tube prior to closure of the mold segments thereon and including a positioning element slidably carried by each of said mold segments for linear movement relative thereto outside the confines of the mold cavity, said elements projecting inwardly from the mold segments toward the tube and having confronting faces provided with central notches opening toward one another and abutment surfaces outside the confines of said notches, initial movement of said mold segments toward the tube bringing said abutment surfaces of said elements into abutment with a waste portion of the tube confined by the registering central notches in alignment with the mold segments, and lost-motion means accommodating sliding movement of the positioning elements relative to the mold segments upon full closure of the mold segments, thereby maintaining said element abutment surfaces in engagement and the tube confined by the notches.

6. In an apparatus for forming a blown plastic article from a blowable plastic tube and including a pair of cooperating mold segments movable into abutment to enclose a portion of the tube and means to inject a blowing medium thereinto to inflate the mold enclosed portion of the tube against the mold cavity defined by the mold segments, the improvements of means to position the tube without substantial tube deformation prior to closure of the mold segments thereon and including a positioning element carried by each of said mold segments and lying entirely outside the confines of the mold cavity portion defined by the mold segment, said elements having confronting faces lying between the mold segments when open, said faces each having a notch and an abutment surface adjacent said notch, initial tube-enclosing movement of said mold segments bringing said elements into abutment with one another and positioning the tube in the registering notches prior to contact of the mold segments with the tube, and lost-motion means accommodating further movement of the mold segments into abutment with one another and into contact with the tube while maintaining said elements in engagement and the tube confined by the notches without collapsing the tube portion engaged by the elements.

7. Apparatus for blow molding articles from a freely vertically pendant moldable plastic tube, comprising a pair of blow mold segments horizontally shiftable relative to one another between open and closed positions, said mold segments when closed defining an interior mold space enclosing a medial portion of the tube, a tube-engaging element on each of said mold segments, means securing said elements to the mold segments, respectively, for horizontal shifting movement therewith, said elements having confronting tube-engaging surfaces spaced apart through a distance less than the distance of movement of said mold segments from their open to their closed position, said confronting surfaces being engageable with portions of the tube displaced vertically from the confines of the mold cavity prior to closure of the mold segments, said securing means including a lost motion connection between said elements and said mold segments, respectively, to accommodate relative segment-to-element movement during closure of the segments while maintaining element-to-tube engagement, and power means for horizontally shifting said mold segments and the associated elements carried thereby.

8. The apparatus defined in claim 7, wherein the lost motion connection includes a spring mounted between each tube-engaging element and its corresponding mold segment, and a pair of abutments respectively provided on said tube-engaging element and said mold segment cooperating to limit the outward projection of the tube-engaging element relative to the corresponding mold segment.

References Cited in the file of this patent

UNITED STATES PATENTS

| Re. 23,564 | Hobson | Oct. 14, 1952 |
| 1,848,940 | Delpech | Mar. 8, 1932 |
| 2,899,709 | Steiner | Aug. 18, 1959 |
| 2,930,740 | Parfrey | Sept. 15, 1959 |

FOREIGN PATENTS

| 1,104,304 | France | June 8, 1955 |
| 1,126,231 | France | July 23, 1956 |
| 744,927 | Great Britain | Feb. 15, 1956 |